United States Patent [19]

Viertel et al.

[11] 4,203,149
[45] May 13, 1980

[54] SUN VISOR FOR VEHICLES

[75] Inventors: Lothar Viertel, Wuppertal; Gert Mahler, Radevormwald; Manfred Nowak, Solingen, all of Fed. Rep. of Germany

[73] Assignee: Gebr. Happich GmbH, Wuppertal, Fed. Rep. of Germany

[21] Appl. No.: 904,760

[22] Filed: May 11, 1978

[30] Foreign Application Priority Data

Jun. 4, 1977 [DE] Fed. Rep. of Germany ....... 2725430

[51] Int. Cl.² ................................................ B60J 3/02
[52] U.S. Cl. .................................. 362/144; 296/97 B; 296/97 H; 362/204; 362/295
[58] Field of Search ................. 296/97 R, 97 B, 97 C, 296/97 H, 97 J; 362/135, 136, 137, 144, 155

[56] References Cited

U.S. PATENT DOCUMENTS

| 1,239,493 | 9/1917 | Lampert | 362/144 |
| 2,431,491 | 11/1947 | Lee et al. | 362/137 |
| 2,468,248 | 4/1949 | Wachtel | 362/137 |
| 3,375,364 | 3/1968 | Marcus | 296/97 R X |
| 3,381,120 | 4/1968 | Fleisher et al. | 362/136 |
| 4,000,404 | 12/1976 | Marcus | 296/97 H |

FOREIGN PATENT DOCUMENTS 1917618  7/1970  Fed. Rep. of Germany ........ 296/97 C Primary Examiner—Joseph F. Peters, Jr.
Assistant Examiner—Michael Mar
Attorney, Agent, or Firm—Ostrolenk, Faber, Gerb & Soffen

[57] ABSTRACT

A sun visor, including a mirror which can be lighted: there is an outer frame secured in the visor body and an inner frame which can be snapped into and out of the inner frame between two pivot positions; an electric contact on the inner frame engages a contact on the outer frame when the inner frame is flipped out; a spring biased latch holds the inner frame in the outer frame; when the latch is released, a spring biases the inner frame to be flipped out.

36 Claims, 7 Drawing Figures

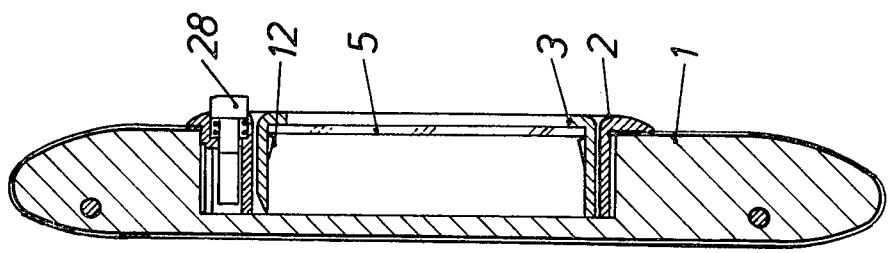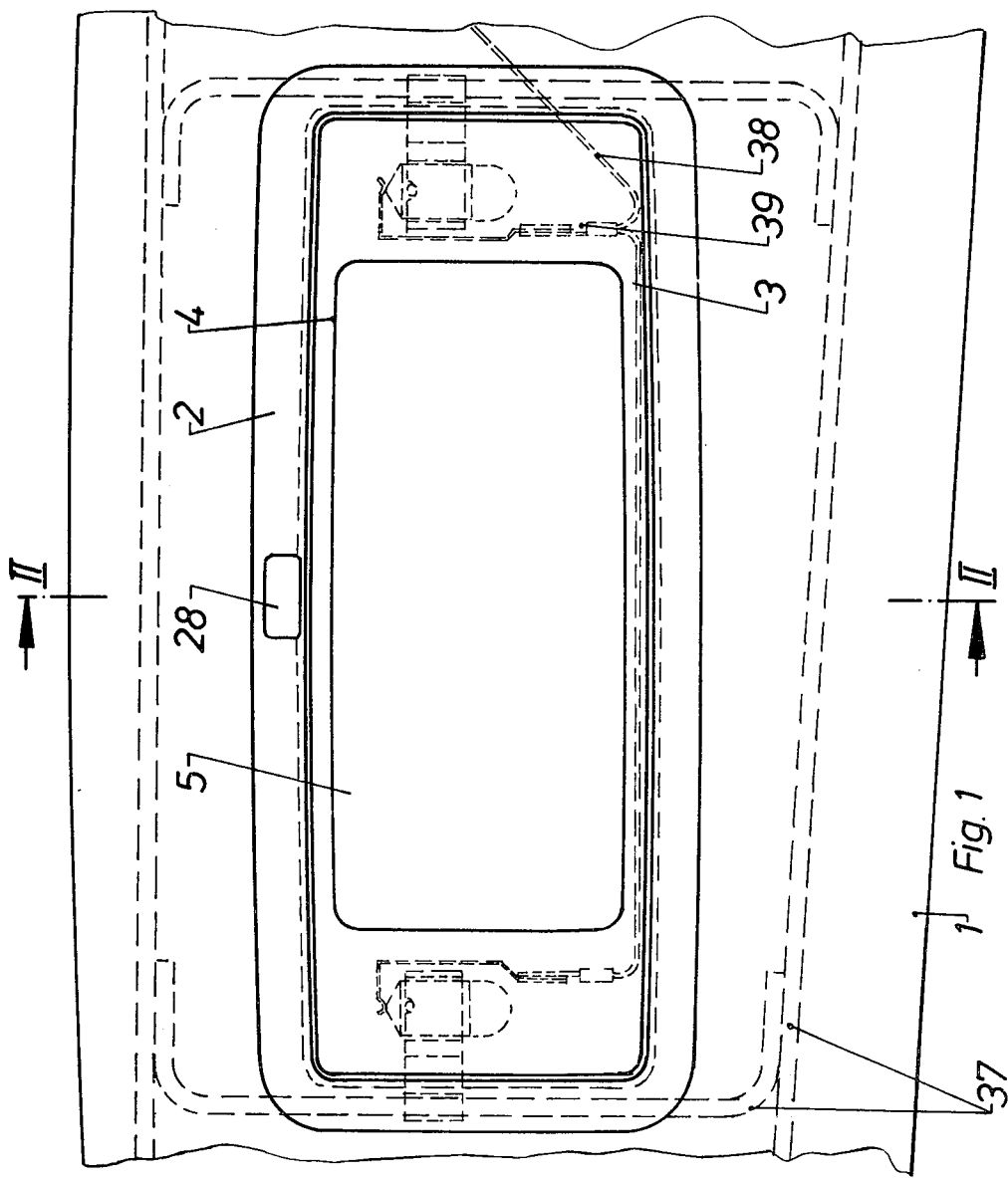

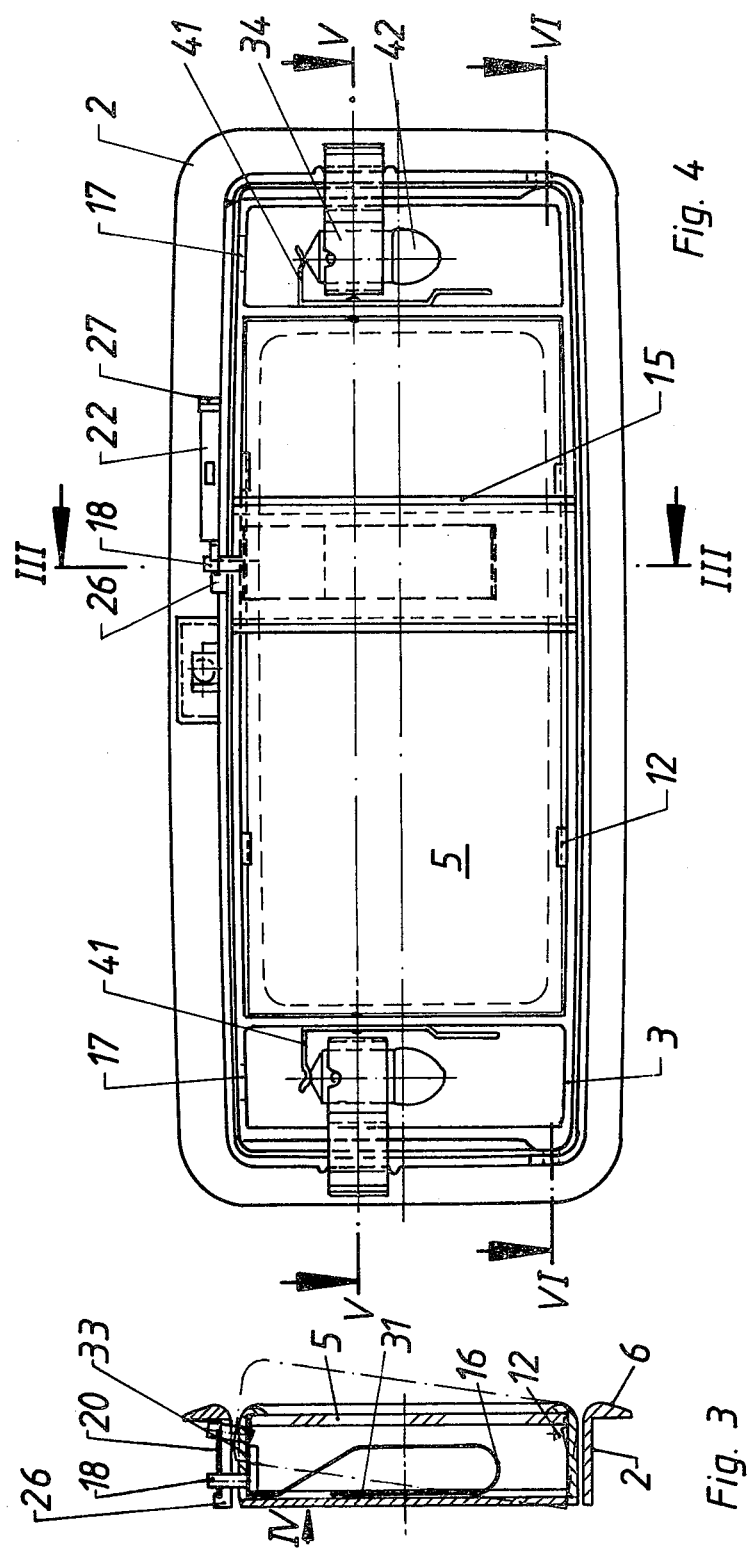

SUN VISOR FOR VEHICLES

BACKGROUND OF THE INVENTION

1. Field of the Invention

The invention relates to a sun visor for a motor vehicle and more particularly to a mirror which is accommodated in the body of the sun visor and which can be lighted by a least one light source.

2. Description of the Prior Art

It is known to provide vehicle sun visors with mirrors. Mirror equipped sun visors are usually installed on the passenger side of motor vehicles. To enable the mirror to also be used in darkness, it is further known to coordinate a light source with the mirror. The light source usually comprises a small incandescent bulb.

As shown, for example, in U.S. application Ser. No. 866,992, filed Jan. 5, 1978, the light bulb is located above the mirror in a housing which is part of a hinged cover that covers the mirror when it is not in use. The hinged cover is itself also a switch which turns the light source on and off as the cover is, respectively, opened and closed.

The above described sun visor has a number of disadvantages. The hinged cover is an additional component which increases the cost of the sun visor and must be separately produced and assembled. If the light source is on for a long period of time, heat accumulates inside its housing and this greatly shortens the life of the bulb. Also, flipping the hinged cover up always turns on the light source, which is often undesirable, particularly in daylight.

SUMMARY OF THE INVENTION

It is an object of the invention to provide a sun visor of the kind described above, which has a lighted mirror with fewer components and which is, therefore, less expensive.

It is another object of the invention to make use of the mirror possible with the light source shut off.

It is a further object to avoid the accumulation of heat in the light source housing when the light source is turned on.

According to the invention, the mirror is fastened to an inner frame which is mounted in an outer frame in a manner permitting the inner frame to be moved, flipped or snapped out of the outer frame. The inner frame is equipped with at least one electric contact element connected to the light source. When the inner frame has been flipped out, the contact element of the inner frame makes contact with a cooperating contact on the outer frame for energizing the light source. This improves the usefulness of the sun visor considerably. In addition, it simplifies sun visor production because providing an operational light source does not require producing and assembling a hinged cover over the light source. Further, after the entire sun visor body has been flipped or swiveled down from its position against the roof of the vehicle, the mirror is always ready for use because it is not covered up by a hinged cover. Even during darkness, the light source can be turned on by flipping out the inner frame that carries the mirror. This is because the inner frame, which is equipped with contact elements, acts as an electric switch.

The lower long edge of the inner frame is accommodated hinge-like in the outer frame. The upper edge of the inner frame carries a projecting pin which engages an oblong hole provided in the outer frame. This serves to limit the hinged motion of the inner frame with respect to the outer frame. The inner frame can be flipped out in accordance with the length of the oblong hole and the structural height of the sun visor body.

At its upper end, the inner frame has one or more ventilating holes in the area of or above each light source. When the top end of the inner frame is flipped forward out of the outer frame, this turns on the light source and also exposes the ventilation holes of the light sources. This results in automatic ventilation of the light source and precludes the accumulation of heat.

In another embodiment of the invention, there is a spring plate, which is disposed on the upper horizontal web of the outer frame. The spring plate carries an undercut catch opening for the projecting pin of the inner frame and the spring plate is movable to release the pin and the inner frame to move by means of a spring-loaded push button. The spring plate is movable against the force of a spring arm which forms an integral part of the spring plate. At its end opposite the spring arm the spring plate has an oblique surface resting against a cooperatingly oblique surface of the push button. This creates an effective locking arrangement, whereby the inner frame is secured in its snapped in position and is unlockable in a simple manner by actuating the push button.

To facilitate flipping out the inner frame, a U-shaped opening spring pushes out the inner frame. This spring has legs of different lengths. The shorter leg is disposed on the outer frame and the longer leg has a bent end portion, to which the pin that is guided in the oblong hole of the outer frame is riveted.

The inner frame may have a chamber on each of its vertical sides. Each chamber opens toward the back of the inner frame and it contains a socket for an incandescent bulb. The socket has an extension, a contact boss of which projects beyond the lateral edge of the inner frame and meets the contact on the outer frame. These chambers center the light emitted by the light sources and stiffen the inner frame.

Other objects and features of the invention are explained with reference to the accompanying drawings.

BRIEF DESCRIPTION OF THE DRAWINGS

FIG. 1 is a front elevational view of a sun visor which is equipped with a lightable mirror;

FIG. 2 is a cross-sectional view along line II—II of FIG. 1;

FIG. 3 is a vertical cross-sectional view of a mirror frame along line III—III of FIG. 4;

FIG. 4 is a front elevational view of the mirror shown in FIG. 3, viewed in the direction of arrow IV;

DESCRIPTION OF A PREFERRED EMBODIMENT

FIGS. 1 and 2 show a sun visor body. In the body is embedded a mirror frame comprising an outer frame 2 and an inner frame 3. The inner frame is inserted in the outer frame and can be moved, snapped or flipped out of it. The inner frame 3 has a frame opening 4 in it, behind which the mirror 5 is disposed.

Figure 7:
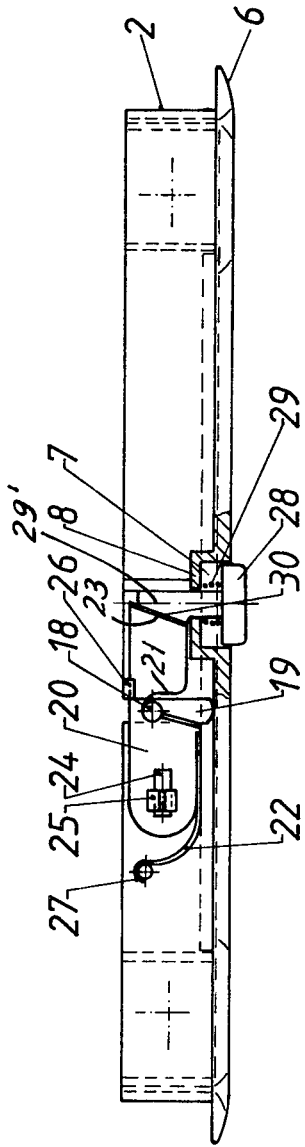
FIG. 7 is a top view of the mirror frame.

On its front side, the outer frame 2 has a flange-like collar 6 that surrounds it. As shown in FIG. 7, the collar 6 has in its upper horizontal side or web a depression 7 with a central opening in the bottom 8. Toward the bottom of each vertical web of the outer frame 2, a cutout 9 is formed. Each cutout forms a bearing hole that serves to seat a pin 10 which is formed on the inner frame 3. Chamfers 11 entering the cutouts 9 make the introduction of the pins 10 easier.

Figure 5:
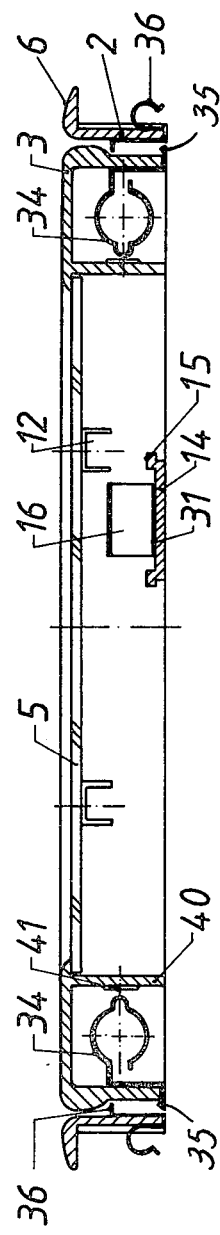
FIG. 5 is a cross-sectional view along line V—V of FIG. 3.
Figure 6:
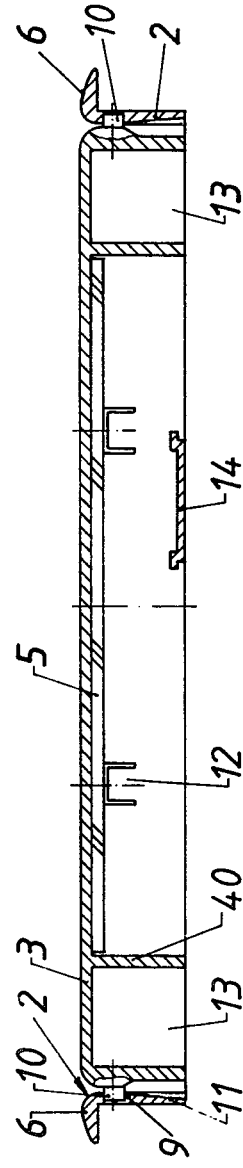
FIG. 6 is a cross-sectional view along line VI—VI of FIG. 3.

The inner frame 3 is essentially of box shape. It has on its walls lanced-out springy detent tabs 12 which serve to retain the mirror 5 at the front side of the frame. In addition, along the side areas of the inner frame 3, there are chambers 13, each of which opens toward the back of the inner frame. A vertical web 14 is carried on or at the back of frame 3 or in the body of the sun visor. The web 14 has cam shaped lugs 15 which support a below described opening spring 16 above the chambers 13. The upper frame walls of the inner frame 3 have one or more ventilating holes 17. As may be seen particularly well in FIGS. 5 and 6, the frame walls of the inner frame 3 narrow rearwardly of the frame.

The inner frame 3 is mounted in the outer frame 2 by the pins 10 so that the inner frame can be flipped out of the outer frame. The dash-dotted line in FIG. 3 indicates the flipped-out position of the inner frame.

There is a pin 18, which is guided in an oblong hole 19 formed in the upper horizontal web of the outer frame 2. The engagement of the pin 18 in the hole 19 serves to limit the pivoting motion of the inner frame. At the same time, the pin 18 forms a locking element for securing the inner frame 3 at its inward position. To accomplish this, the pin 18 interacts with a spring plate 20 supported atop the outer frame 2.

The spring plate 20 has an undercut slit opening 21 extending in from a side edge of the plate 20 and in the undercut of which, the pin 18 is trapped, as shown in FIG. 7. A bent-up spring arm 22 is attached on the plate 20 and is curved backwardly. The spring arm 22 is supported by a pin 27 fixed on the frame 2. The spring 22 normally biases the plate 20 to the right in FIG. 7 normally to trap the pin 18. A bent-up oblique surface 23 at the edge of plate 20 cooperates in the release of pin 18. The spring plate 20 has an elongated hole 24 in it and a clip pin 25 from the outer frame 2 passes through the hole 24 to clip the plate 20 to the frame 2 and guide the sliding of the plate 20. Additionally, the plate 20 is retained by another clip 26.

Through actuating the push button 28, the spring plate 20 is movable against the force of the spring arm 22. The push button 28 can be pushed into the depression 7 at the top of the collar 6 against the force of a return spring 29. The push button 28 has a pin with a bevel surface 30 which rests against the oblique surface 23 of the spring plate 20. FIG. 7 shows the locked, or flipped-in position of the inner frame 3. For flipping out the inner frame 3, including the mirror 5, the push button 28 is depressed. This moves the spring plate 20 to the left in FIG. 7, releasing the pin 18 from the undercut of the slit opening 21. Thereafter the inner frame 3 can be flipped out of the outer frame 2.

Flipping out of the inner frame is expediently automatically accomplished by the opening spring 16. The spring is of U-shape comprising a shorter leg 31, which supports itself against the web 14 and comprising a longer leg 32, which, after several bends, has an end portion 33 retained in a clip structure on the upper wall of the inner frame 3. The pin 18 penetrates a slit opening in the upper wall of the inner frame 3 and is riveted to the end portion 33 of the spring 16.

Disposed in each of the chambers 13 is a socket, which is fastened to the vertical side wall of the inner frame 3. Each socket includes an integral contact boss 35 that projects beyond the edge of the inner frame 3. In the flipped-out position of the inner frame 3, the contact bosses 35 make contact with the stationary contacts 36 supported on the outer frame 2. Contacts 36 are mechanically and electrically connected with the metallic wire insert 37 of the sun visor body 1 and are ground contacts. Electric current is supplied through a conductor 38 connected to the electrical system of the vehicle. Through a plug element 39, the conductor 38 is connected to the contact 41 which is mounted to the chamber wall 40. By flipping the inner frame 3 out, the contacts 35, 36 are engaged and the light sources comprised of samll incandescent bulbs 42 are turned on. The light sources are turned off again by flipping the inner frame 3 in again. The inner frame 3 is flipped into the outer frame also when the sun visor body is swung up because the inner frame is then pushed against the interior of the vehicle roof.

The inner and outer frames may be produced inexpensively as plastic injection moldings. Assembling the components connected with the mirror can be accomplished quickly and simply by plug-in assembly.

Although the present invention has been described in connection with a preferred embodiment thereof, many variations and modifications will now become apparent to those skilled in the art. It is preferred, therefore, that the present invention be limited not by the specific disclosure herein, but only by the appended claims.

We claim:

1. A sun visor for vehicles, or the like, comprising:
a sun visor body; a mirror;
frame means for holding said mirror to the exterior of said visor body whereby said mirror is always exposed at the exterior of said visor body and for enabling said mirror to be flipped into and out of said visor body;
said frame means comprising an outer frame in said visor body and comprising an inner frame which is flippably mounted in said outer frame, such that said inner frame may be flipped partially out of said outer frame; said mirror being supported on and flippable with said inner frame;
an electric contact in said outer frame; a cooperating electric contact on said inner frame and placed such that with said inner frame flipped into said outer frame, said electric contacts are disengaged and with said inner frame flipped out of said outer frame, said electric contacts are in engagement;
a light source attached to and movable with said inner frame and connected to said inner frame electric contact for being energized by said contacts being in engagement said inner frame has a chamber therein in which said light source is located; said inner frame chamber having a ventilating hole communicating into said inner frame chamber, wherein said ventilating hole is so placed on said inner frame that when said inner frame is flipped into said outer frame, said ventilating hole is covered and when said inner frame is flipped out of said outer frame, said ventilating hole is uncovered.

2. The sun visor of claim 1, wherein said inner frame chamber has a socket therein for mechanically receiving a light bulb and for electrically connecting a light bulb with said inner frame electric contact; said inner frame electric contact being connected with said socket.

3. The sun visor of claim 1, wherein said inner frame electric contact projects beyond the edge of said inner frame for engaging said outer frame contact.

4. The sun visor of claim 3, wherein said inner frame is connected, in hinge-like manner, to said outer frame, along one respective side of each of said inner and said outer frames.

5. The sun visor of claim 1, wherein said inner frame is connected, in hinge-like manner, to said outer frame, along one respective side of each of said inner and said outer frames;
said ventilating hole being on a side of said inner frame away from the side of said inner frame which is hingedly joined to said outer frame.

6. The sun visor of claim 1, wherein said inner frame is connected, in hinge-like manner, to said outer frame, along one respective side of each of said inner and said outer frames.

7. The sun visor of either claims 1 or 6, further comprising limiting means for limiting the extent to which said inner frame may flip out of said outer frame.

8. The sun visor of claim 7, wherein said limiting means comprises a pin on said inner frame and a hole in said outer frame, said hole being elongated in the direction of flipping movement of said inner frame.

9. The sun visor of either of claims 1 or 6, further comprising retaining means for normally retaining said inner frame flipped into said outer frame.

10. The sun visor of claim 9, further comprising releasing means for releasing said retaining means, enabling said inner frame to flip out of said outer frame.

11. The sun visor of claim 10, further comprising inner frame biasing means for normally biasing said inner frame to flip out of said outer frame.

12. The sun visor of claim 11, wherein said inner frame biasing means comprises a generally U-shaped spring, with one leg of said spring connected with said pin for urging said pin and said inner frame out of said outer frame.

13. The sun visor of claim 9, wherein said retaining means comprises a pin projecting from said inner frame and comprises means on said outer frame for retaining said pin against moving in a manner which would enable said inner frame to flip out of said outer frame.

14. The sun visor of claim 13, wherein said means on said outer frame comprises a spring plate which engages said pin; spring plate biasing means for biasing said spring plate to retain said pin.

15. The sun visor of claim 14, further comprising releasing means for releasing said retaining means, enabling said inner frame to flip out of said outer frame.

16. The sun visor of claim 15, further comprising inner frame biasing means for normally biasing said inner frame to flip out of said outer frame.

17. The sun visor of claim 16, wherein said inner frame biasing means comprises a generally U-shaped spring, with one leg of said spring connected with said pin for urging said pin and said inner frame out of said outer frame.

18. The sun visor of claim 14, wherein said spring plate includes an undercut catch opening which traps said pin and said spring plate biasing means holding said pin normally trapped.

19. The sun visor of claim 18, further comprising releasing means for releasing said retaining means, enabling said inner frame to flip out of said outer frame.

20. The sun visor of claim 18, further comprising limiting means for limiting the extent to which said inner frame may flip out of said outer frame.

21. The sun visor of claim 20, further comprising releasing means for releasing said retaining means, enabling said inner frame to flip out of said outer frame.

22. The sun visor of claim 21, further comprising inner frame biasing means for normally biasing said inner frame to flip out of said outer frame.

23. The sun visor of claim 22, wherein said inner frame biasing means comprises a generally U-shaped spring, with one leg of said spring connected with said pin for urging said pin and said inner frame out of said outer frame.

24. The sun visor of claim 20, wherein said limiting means comprises said pin on said inner frame and a hole in said outer frame, said hole being elongated in the direction of flipping movement of said inner frame.

25. The sun visor of claim 18, wherein said spring plate includes an oblique surface thereon; said releasing means comprises a button movable transversely to the path of motion of said spring plate, to move toward and away from trapping said pin; said button including a cooperating surface for engaging said spring plate oblique surface.

26. The sun visor of claim 25, further comprising inner frame biasing means for normally biasing said inner frame to flip out of said outer frame.

27. The sun visor of claim 26, wherein said inner frame biasing means comprises a generally U-shaped spring, with one leg of said spring connected with said pin for urging said pin and said inner frame out of said outer frame.

28. A sun visor for vehicles, or the like, comprising:
a sun visor body; a mirror;
frame means for holding said mirror to the exterior of said visor body whereby said mirror is always exposed at the exterior of said visor body and for enabling said mirror to be flipped into and out of said visor body;
said frame means comprising an outer frame in said visor body and comprising an inner frame which is flippably mounted in said outer frame, such that said inner frame may be flipped partially out of said outer frame;
retaining means for normally retaining said inner frame flipped into said outer frame; releasing means for releasing said retaining means, enabling said inner frame to flip out of said outer frame; inner frame biasing means for normally biasing said inner frame to flip out of said outer frame;
said retaining means comprises a pin projecting from said inner frame and comprises means on said outer frame for retaining said pin against moving in a manner which would enable said inner frame to flip out of said outer frame; said means on said outer frame comprises a spring plate which engages said pin; spring plate biasing means for biasing said spring plate to retain said pin.

29. The sun visor of claim 28, further comprising limiting means for limiting the extent to which said inner frame may flip out of said outer frame.

30. The sun visor of claim 29, wherein said limiting means comprises a pin on said inner frame and a hole in said outer frame, said hole being elongated in the direction of flipping movement of said inner frame.

31. The sun visor of claim 28, wherein said spring plate includes an undercut catch opening which traps said pin and said spring plate biasing means holding said pin normally trapped.

32. The sun visor of claim 31, further comprising inner frame biasing means for normally biasing said inner frame to flip out of said outer frame.

33. The sun visor of claim 32, further comprising limiting means for limiting the extent to which said inner frame may flip out of said outer frame.

34. The sun visor of claim 33, wherein said limiting means comprises said pin on said inner frame and a hole in said outer frame, said hole being elongated in the direction of flipping movement of said inner frame.

35. The sun visor of claim 34, wherein said spring plate includes an oblique surface thereon; said releasing means comprises a button movable transversely to the path of motion of said spring plate, to move toward and away from trapping said pin; said button including a cooperating surface for engaing said spring plate oblique surface.

36. The sun visor of claim 33, wherein said inner frame biasing means comprises a generally U-shaped spring, with one leg of said spring connected with said pin for urging said pin and said inner frame out of said outer frame.

* * * * *